United States Patent
Garfinkle et al.

(10) Patent No.: US 9,652,622 B2
(45) Date of Patent: May 16, 2017

(54) DATA SECURITY UTILIZING DISASSEMBLED DATA STRUCTURES

(71) Applicant: Princeton SciTech, LLC, New York, NY (US)

(72) Inventors: Norton Garfinkle, New York, NY (US); Richard Garfinkle, Chicago, IL (US)

(73) Assignee: Princeton SciTech, LLC, New York, NY (US)

( * ) Notice: Subject to any disclaimer, the term of this patent is extended or adjusted under 35 U.S.C. 154(b) by 295 days.

(21) Appl. No.: 14/574,039

(22) Filed: Dec. 17, 2014

(65) Prior Publication Data

US 2016/0180101 A1    Jun. 23, 2016

(51) Int. Cl.
G06F 7/04     (2006.01)
G06F 21/62    (2013.01)

(52) U.S. Cl.
CPC .......... *G06F 21/62* (2013.01); *G06F 21/6218* (2013.01)

(58) Field of Classification Search
CPC ... G06F 3/067; G06F 21/6218; H04L 67/1097
See application file for complete search history.

(56) References Cited

U.S. PATENT DOCUMENTS

| 8,495,367 | B2 | 7/2013 | Ben-Natan | |
| 8,700,890 | B2* | 4/2014 | Runkis | H04L 9/0894 |
| | | | | 341/51 |
| 2006/0013080 | A1* | 1/2006 | Shibata | G06F 21/6218 |
| | | | | 369/30.01 |
| 2007/0140481 | A1 | 6/2007 | Parameswaran Rajamma | |
| 2010/0306524 | A1* | 12/2010 | Runkis | H04L 9/0894 |
| | | | | 713/150 |
| 2011/0307459 | A1* | 12/2011 | Jacob | G06T 1/60 |
| | | | | 707/705 |
| 2012/0300931 | A1* | 11/2012 | Ollikainen | G06F 21/6272 |
| | | | | 380/262 |

FOREIGN PATENT DOCUMENTS

WO    WO-2016100644 A1    6/2016

OTHER PUBLICATIONS

"International Application Serial No. PCT/US2015/066339, Article 34 Response filed Oct. 17, 2016 to Written Opinion mailed Mar. 3, 2016", 20 pgs.
"International Application Serial No. PCT/US2015/066339, International Search Report mailed Mar. 3, 2016", 3 pgs.
"International Application Serial No. PCT/US2015/066339, Written Opinion mailed Mar. 3, 2016", 7 pgs.

(Continued)

*Primary Examiner* — Farid Homayounmehr
*Assistant Examiner* — Lizbeth Torres-Diaz
(74) *Attorney, Agent, or Firm* — Schwegman Lundberg & Woessner, P.A.

(57) ABSTRACT

Various examples are directed to machines and methods for disassembling and reassembling data structures. An ordered set of functions may be applied to a data array comprising a plurality of data units, each associated with a unique coordinate set. Data units returned by the ordered set of functions may be written in order to one or more disassembled data containers.

20 Claims, 17 Drawing Sheets

(56) References Cited

OTHER PUBLICATIONS

Guo, Wenping, "A New Digital Image Scrambling Encryption Algorithm Based on Chaotic Sequence," School of Mathematics and Information Engineering, Taizhou University, Linhai, China, pp. 399-401 (2011).
"International Application Serial No. PCT/US2015/066339, International Preliminary Report on Patentability mailed Dec. 30, 2016", 8 pgs.

* cited by examiner

DATA SECURITY UTILIZING DISASSEMBLED DATA STRUCTURES

BACKGROUND

Data security has become a vital issue for individuals, corporations, and nations. Current methods for data security utilize encryption. Encryption works by producing an unreadable data set from a readable one by applying an encryption key. Encrypted data, therefore, contains all of the original information. Without the encryption key, or a related decryption key, the data cannot be read. Encrypted data can be compromised either by cracking the encryption method or obtaining the decryption key.

Current methods of encryption are under increasing strain as threats to data security increase in number and sophistication. Previously, the primary data security threats consisted of lone hackers making small-scale breaches to insert viruses, steal individual identities, or commit other petty crimes. Current threats, however, include operators with higher levels of skills and resources, such as crime syndicates and even national intelligence agencies. Also, current threats are often directed towards more damaging hacking activities, such as stealing large numbers of identities or creating long term back doors that can be used to steal up-to-date information over a period of months or years. To protect against current threats, more sophisticated data security techniques are needed.

FIGURES

Various examples of the present invention are described here by way of example in conjunction with the following figures, wherein.

DESCRIPTION

Various examples described herein are directed to data security systems and methods that utilize data disassembly to secure data. According to data disassembly, a readable data structure is broken into data sets and assembly data. The data sets contain original information from the data structure. The original information, however, may be difficult to read from the data sets without first reassembling the data sets to recreate the original data structure. Reassembly may be performed utilizing the assembly data. In this way, the assembly data may be used as a key for accessing the original information from the data structure. The strength of security offered by data disassembly depends on the ease with which the data sets can be reassembled without the assembly data.

In various examples, the data structure is treated as a multi-dimensional array of data units. Each data unit may be designated by a set of coordinates that represent the position of the data unit in the array. The array may be disassembled by applying a series of programmed functions. Each programmed function receives function parameters and provides a sequence of coordinate sets. Data units indicated by the sequence of coordinate sets may be extracted from the array and written to one or more disassembled data containers. Multiple functions may be applied in order. After disassembly, the extracted data units and the remnant of the array may be unreadable. The original data structure may be recreated (or reassembled) by applying the functions to the extracted data units and remnant in reverse order.

Figure 1:
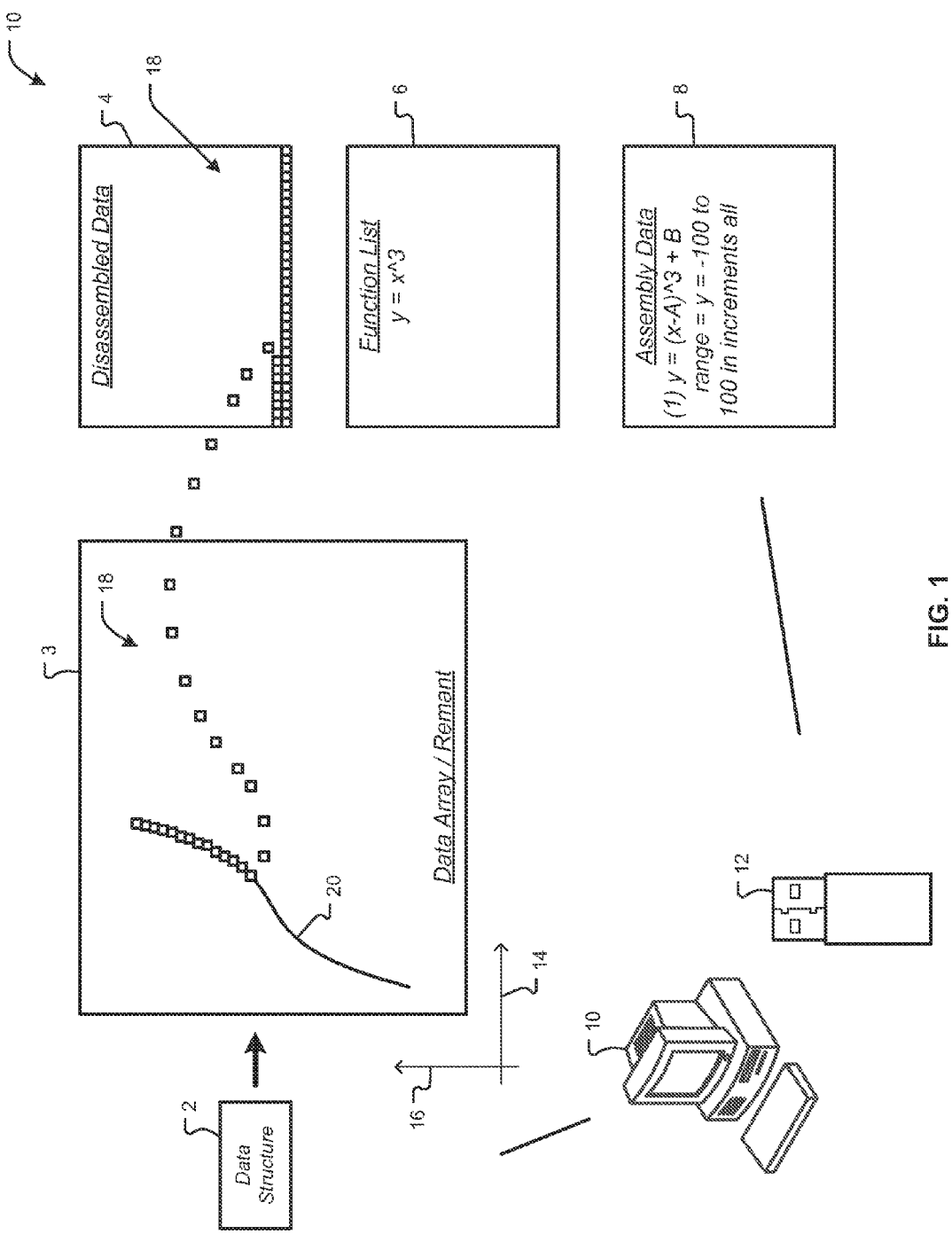
FIGS. 1 and 2 show a diagram illustrating an example disassembly of a data structure using an ordered set of functions.
Figure 2:
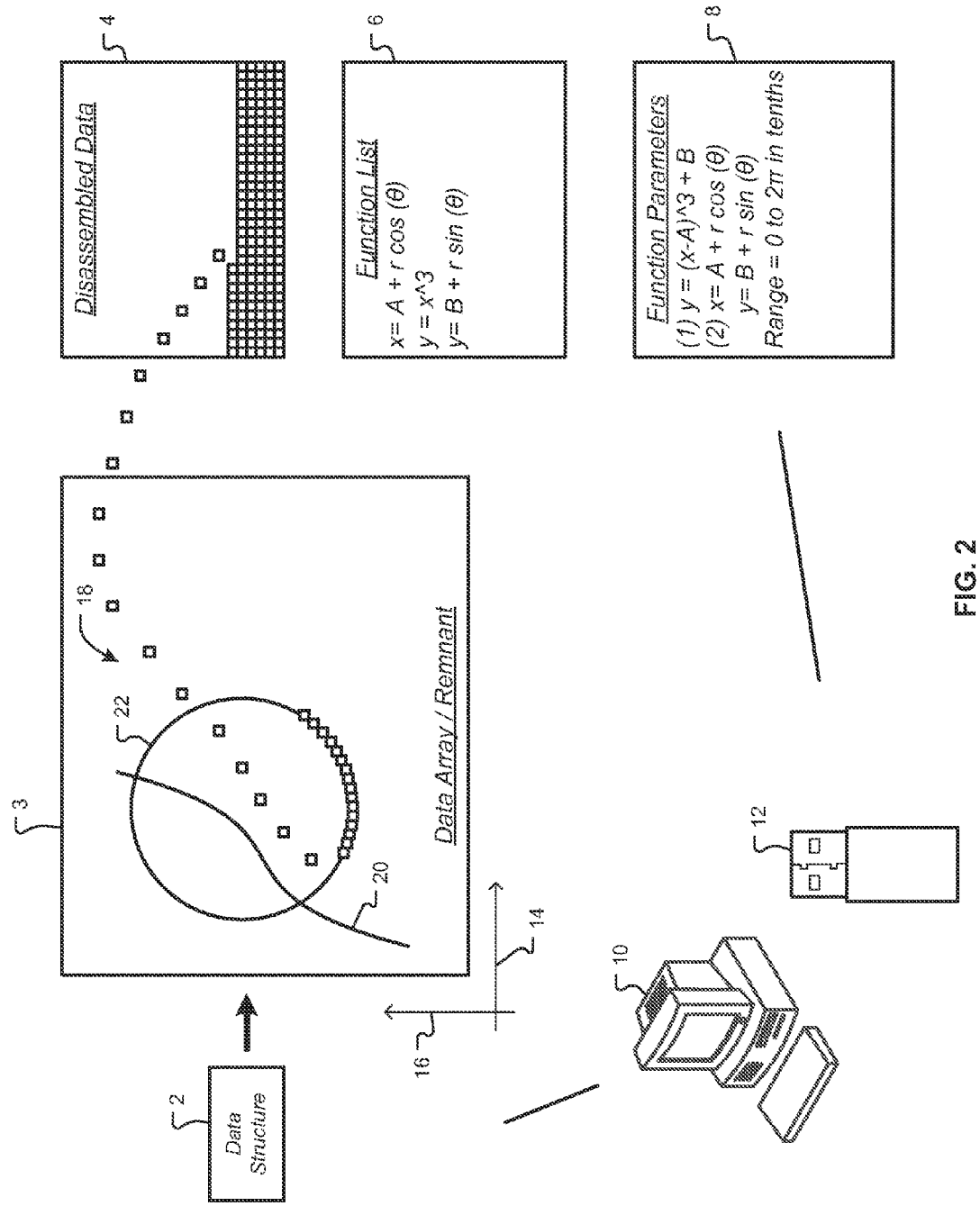

FIGS. 1 and 2 show a diagram 10 illustrating an example disassembly of a data structure 2 using an ordered set of programmed functions. The data structure 2 may be any suitable type or form of data including, for example, a file, a set of files, a directory, a directory structure, etc. Disassembly of the data structure 2 may be performed by any suitable programmed or custom hardware device. Examples include a computer system 10, a dongle 12 for use with a computer system 10, or any other suitable hardware.

The data structure 2 may comprise a plurality of data units. The data units may be defined based on any suitable physical or logical subdivision of the data structure 2. In some examples, data units may be defined based on disk sector size or other physical parameters. For example, a data unit may correspond to a single disk sector, or multiples of a single disk sector. Also, in some examples, data units may be defined based on logical subdivisions of the data structure such as, for example, the smallest unit of data assigned a distinct address by a file system. Each data unit may comprise a single address location or multiple address locations.

In some examples, data units may be determined based on the content of the data structure 2. For example, each data unit in a data structure 2 that is or comprises one or more photographs or other pictures may be or comprise a pixel or other indication of color. Color may be expressed as Red, Green, and Blue (RGB) components or, for example, a cylindrical representation of RGB such as Hue, Saturation and Lightness (HSL) or Hue, Saturation, Value (HSV). In some examples, each characteristic of a pixel (e.g., a Red, Green, Blue, Hue, Saturation, Lightness or Value) may be a separate data unit. In examples where the data structure 2 is or comprises a text file, data units may comprise a word, a character, etc. Other suitable divisions of data may be used. For example, a data unit may comprise a string of a selected number of characters or pixels. For example, a data structure may be divided into data units comprising three characters in a row (or any other suitable number of characters). A data structure comprising an image may be divided into arrays of pixels such as linear arrays (X by 1), square arrays (X by X), rectangular arrays (X by Y), etc.

Figure 3:
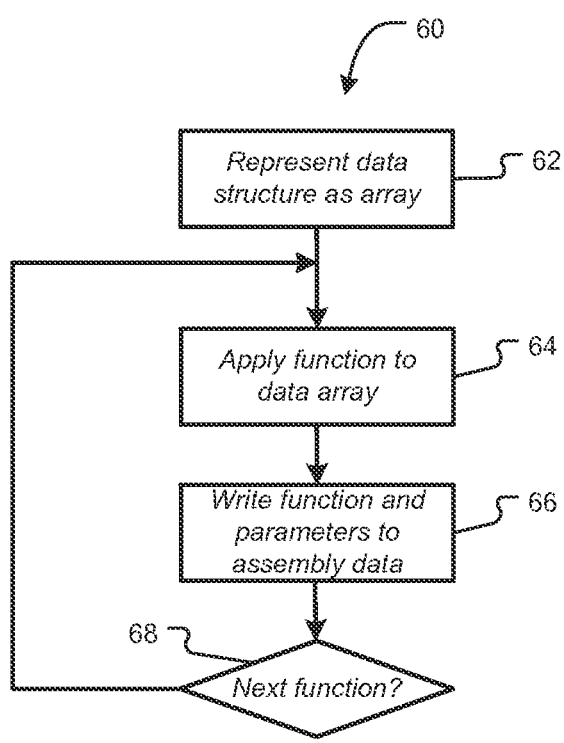
FIG. 3 is a flow chart showing one example of a process flow for disassembling a data structure.

FIG. 3 is a flow chart showing one example of a process flow 60 for disassembling the data structure 2. Although the process flow 60 is described in the context of the data structure 2 shown in FIGS. 1 and 2, the process flow 60 may be used to disassemble various other data structures of various different formats. The process flow 60 may be executed by any suitable data disassembler device, as described herein. At 62, the data disassembler may receive the data structure 2. The data structure 2 may be expressed as a multi-dimensional array 3. For example, each data unit making up the data structure 2 may be described by a unique coordinate set. Coordinate sets may be represented according to any suitable coordinate format including, for example, rectangular or Cartesian coordinates, polar coordinates, cylindrical coordinates, spherical coordinates, etc. If the data structure 2 is not received expressed as a multi-dimensional array, the data disassembler may express the data structure 2 as a multi-dimensional array 3, for example, by assigning a coordinate set to each data unit in the data structure 2. Accordingly, after expressing the data structure 2 as a multi-dimensional array 3, the data disassembler may receive the array 3 (e.g., from a memory or other similar device). Referring to the example of FIG. 1, the data structure 2 is converted to a two-dimensional rectangular array 3. Accordingly, each data unit from the data structure 2 is described by a set of 2 coordinates. In rectangular format, the coordinates for each data unit in the data array 3 may be described by (i) a position on a horizontal or x-axis 14; and (ii) a position on a vertical or y-axis 16.

At 64, the data disassembler may apply a first function from the ordered set of functions to the data array 3. The function may be any type of function that takes one or more input parameters or function parameters and provide as output an ordered series of coordinate sets. Function parameters for a function may include, for example, an offset or offsets for the function, a range over which the function is to be applied, coefficients or other function variations, etc. Data units from the array 3 at the positions of the ordered series of coordinate sets (indicated by 18 in FIGS. 1 and 2) may be written in order to disassembled data 4. At the array 3, the previous location of moved data units 18 may be left blank or filled with a replacement data, as described herein in more detail in conjunction with FIG. 4. The disassembled data 4 may comprise any one or more logical data containers such as, for example, one or more files, one or more sub-files, one or more directories, etc.

At 66, the data disassembler may write the first function and its function parameters to assembly data 8, which may comprise an ordered list of functions and function parameters used in the disassembly. In this way, the data disassembler may create a record of the functions applied to the data array 3, the function parameters used, and the order in which the functions were applied. The assembly data 8 may be used in conjunction with the disassembled data 4 and the remnant of the data array 3 to reassemble the data structure 2, as described herein. The assembly data 8 may comprise any one or more logical data containers such as, for example, one or more files, one or more sub-files, one or more directories, etc. In examples where the ordered set of functions and associated function parameters is created before data disassembly, 66 may be omitted. At 68, the data disassembler may determine whether there is a next function in the ordered set of functions that has yet to be applied to the data structure 2. The next function may be a function immediately after the first function according to the ordered set of functions. If there is no next function, the data disassembler may conclude. If there is a next function, the data disassembler may return to 64 and apply the next function as described.

In some examples, the data disassembler may generate the ordered set of functions during the disassembly process. Accordingly, determining whether there is a next function may comprise determining whether a threshold number of functions have been applied to the array 3. If the threshold has been met, then the data disassembler may conclude. If the threshold has not been met, then the data disassembler may select a next function in any suitable manner. For example, the data disassembler may randomly select the next function from a prepopulated list of functions.

Figure 4:
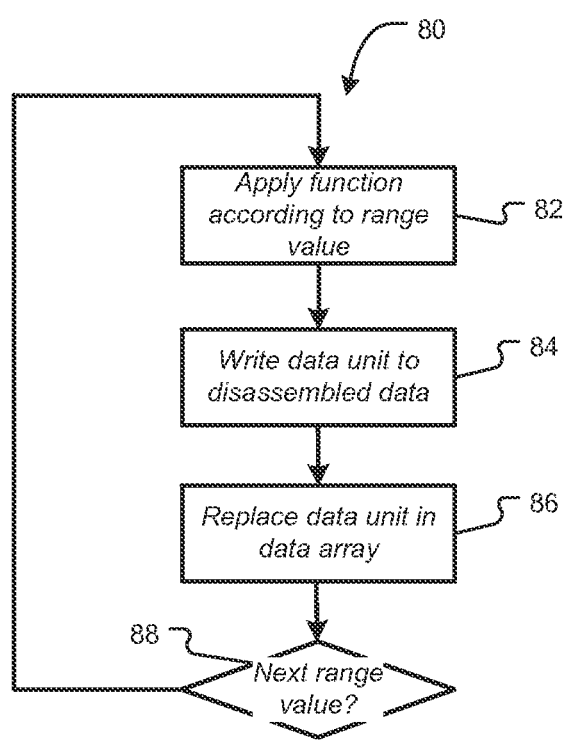
FIG. 4 is a flowchart showing one example of a process flow that may be executed by the data disassembler to apply a function to the data array.

FIG. 4 is a flowchart showing one example of a process flow 80 that may be executed by the data disassembler to apply a function to the data array 3. For example, the process flow 80 shows one example way that the data disassembler may apply a function to the data array 3, as described above with respect to 64. At 82, the data disassembler may apply a function according to a first range value. As described herein, each function may be applied with function parameters that include a range over which the function is to be applied to the array 3. The range may be expressed in any suitable form. For example, when the function is a parametric equation, the range may be expressed as an ordered set of values for the parameter. Also, in some examples, the range may be expressed as an ordered set of values along one or more of the coordinate axes of the array 3.

The first range value, applied to the function, may provide a set of coordinates from the array 3. At 84, the data disassembler may write the data unit at the provided coordinates to the disassembled data 4. Data units may be written to the disassembled data 4 in order. For example, at 84, the data unit may be written to the disassembled data at a position immediately after a position of the previous data unit written to the disassembled data 4. At 86, the data disassembler may replace the data unit in the array 3 with replacement data. Replacement data may be any suitable data including, for example, randomly generated data, a null set, etc. At 88, the data disassembler may determine whether there is a next range value for the function (e.g., whether the data disassembler has already applied the function over the entirety of the indicated range). If there is no next range value for the function, application of the function may be completed. If there is a next range value, the data disassembler may return to 82 and apply the function according to the next range value.

Referring back to FIGS. 1 and 2, the example illustrated by the diagram 10 shows two functions applied to the data array 3. In FIG. 1, a third-degree polynomial function is applied to the array 3. The third-degree polynomial used in the example of FIG. 1 is indicated by Equation (1) below:

$$y=A+(x-B)^3 \quad (1)$$

The function outline 20 indicates the coordinate positions generated by the third degree polynomial utilizing an example set of function parameters. A range for the third-degree polynomial may be expressed as a range of values for x (e.g., the range may include integers between 5 and 20). Additional function parameters may include an offset in the x direction and/or in the y direction, etc. Referring to Equation (1), the offset in the y direction may be given by A while the offset in the x direction may be given by B. Data units 18 on the function outline 20 are moved in order to the disassembled data 4, as shown.

In FIG. 2, a second function is applied to the data array 3. In the example of FIG. 2, the second function is a circle function, indicated by the function outline 22. The circle function may be described in rectangular coordinates by Equations (2) and (3) below:

$$x=A+r\cos(\theta) \quad (2)$$

$$y=B+r\sin(\theta) \quad (3)$$

The circle function, as shown, is a parametric function where the parameter is θ. The range for the circle function may be, for example, a set of values for θ between 0 and 2π. For example, the range values may comprise 100 equidistant values between 0 and 2π. Additional function parameters for the circle function may include, for example, a size of the circle, indicated by r in Equations (1) and (2); an x offset of the circle, indicated by A in Equation (1), a y offset of the circle, indicated by B in Equation (2), etc.

To complete the disassembly of the example data structure 2 in FIGS. 1 and 2 additional functions may be applied, as described herein with respect to FIGS. 3 and 4. The result of the disassembly may include a remnant of data array 3, the disassembled data 4, and assembly data 8. The remnant of the data array 3 may be the data array 3 after the application of the ordered functions and the extraction of selected data units, as described herein. The assembly data 8 may comprise an ordered list of functions applied to disassemble the data along with the function parameters used. In some examples, the result of the disassembly may also comprise a function list 6. The function list 6 may include a listing of the functions used for the disassembly but may omit data necessary to reassemble the data set 2 such as, for example, the order in which the functions were applied, the function parameters, etc. In some examples, the function list 6 may be stored with the data array/remnant 3 and disassembled data 4 without compromising security. When a separate function list 6 is utilized, the assembly data 8 may omit the applied functions and instead comprise references to functions in the function list 6.

Figure 5:
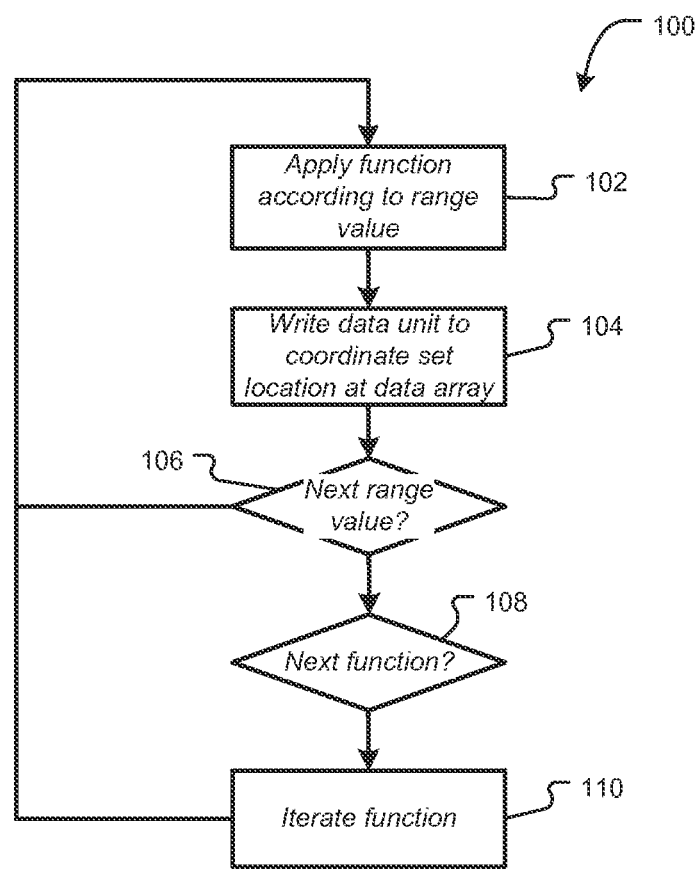
FIG. 5 is a flow chart showing one example of a process flow for reassembling a data structure, such as the data structure, that has been disassembled as described herein.

The data structure 2 may be recreated from the remnant of the data array 3, the disassembled data 4 and the assembly data 8. FIG. 5 is a flow chart showing one example of a process flow 100 for reassembling a disassembled data structure, such as the data structure 2. The process flow 60 may be executed by any suitable data assembler device, as described herein. At 102, the data assembler may apply a function to the disassembled data 4 and array remnant 3 according to a range value. The function may be selected, for example, by applying the ordered set of functions from the assembly data 8 in reverse order. For example, the first function applied to assemble the data structure 2 may be the last function that was applied to disassemble it. Functions applied to assemble data may be applied utilizing the same function parameters that were utilized during disassembly. Values for the function range, however, may also be applied in reverse order. For example, the last range value for the function applied during disassembly may be the first range value for the function applied during assembly; the next-to-last range value for the function applied during disassembly may be the second range value for the function applied during disassembly, and so on. Referring to FIG. 2, for example, if the circle function is applied during disassembly with a range of values in order from 0 to 2π, the same range may be used during assembly in order from 2π to 0.

For each value in the function range, the function may produce a coordinate set. At 104, the data assembler may pull a next data unit from the disassembled data 4 and write it to the determined location at the array 103. Data units may be selected from the disassembled data 4 in the reverse of the order in which they were written. For example, the last data unit written to the disassembled data 4 may be the first written back to the array 3, the next-to-last data unit written to the disassembled data 4 may be the second written back to the array 3 and so on. In this way, the assembler may reverse the operation of the disassembler by writing data units from the disassembled data 4 back to their original location in the array 3.

At 106, the data assembler may determine whether there is a next range value for the function. For example, the data assembler may determine whether it has already applied the complete range for the function. If not, then data assembler may return to 102 and apply the function according to the next range value. If all range values for the function have been applied, the data assembler may determine, at 108, whether there is a next function to be applied. For example, the data assembler may determine whether all of the functions applied during disassembly have been applied during assembly. If not, then the data assembler may iterate to the next function to be considered at 110 and return to 102 and apply the next function according to its next value range. For example, the data assembler may continue to proceed backwards through the ordered set of functions applied during disassembly. If no functions remain to be applied, then data array 3 may comprise all of the data from the data structure 2 in its original order. In some examples, this data may be readable. In other examples, this data may be transformed from the array format of the array 3 back to the format of the original data structure 2.

As described, the data disassembly and assembly may be used as a data security mechanism to protect the data structure 2 from undesired access. For example, the assembly data 8 may be used as a key for accessing the original information stored in the data structure. The remnant of the data array 3 and the disassembled data 4 may be stored separate from the assembly data 8. Without access to the assembly data 8 it may be very difficult to recreate the data structure 2 in readable form. In various examples, security may be enhanced by using data disassembly and assembly in conjunction with encryption. For example, the data structure 2 and/or data array 3 may be encrypted prior to disassembly. Accordingly, when the data structure 2 is reassembled, it (and/or the data array 3) is also decrypted before it is readable. Also, in some examples, the remnant of the data array 3 and/or disassembled data 4 may be encrypted after disassembly. Accordingly, when the data structure 2 is to be reassembled, the data array/remnant 3 and/or disassembled data may be decrypted before reassembly.

Figure 6:
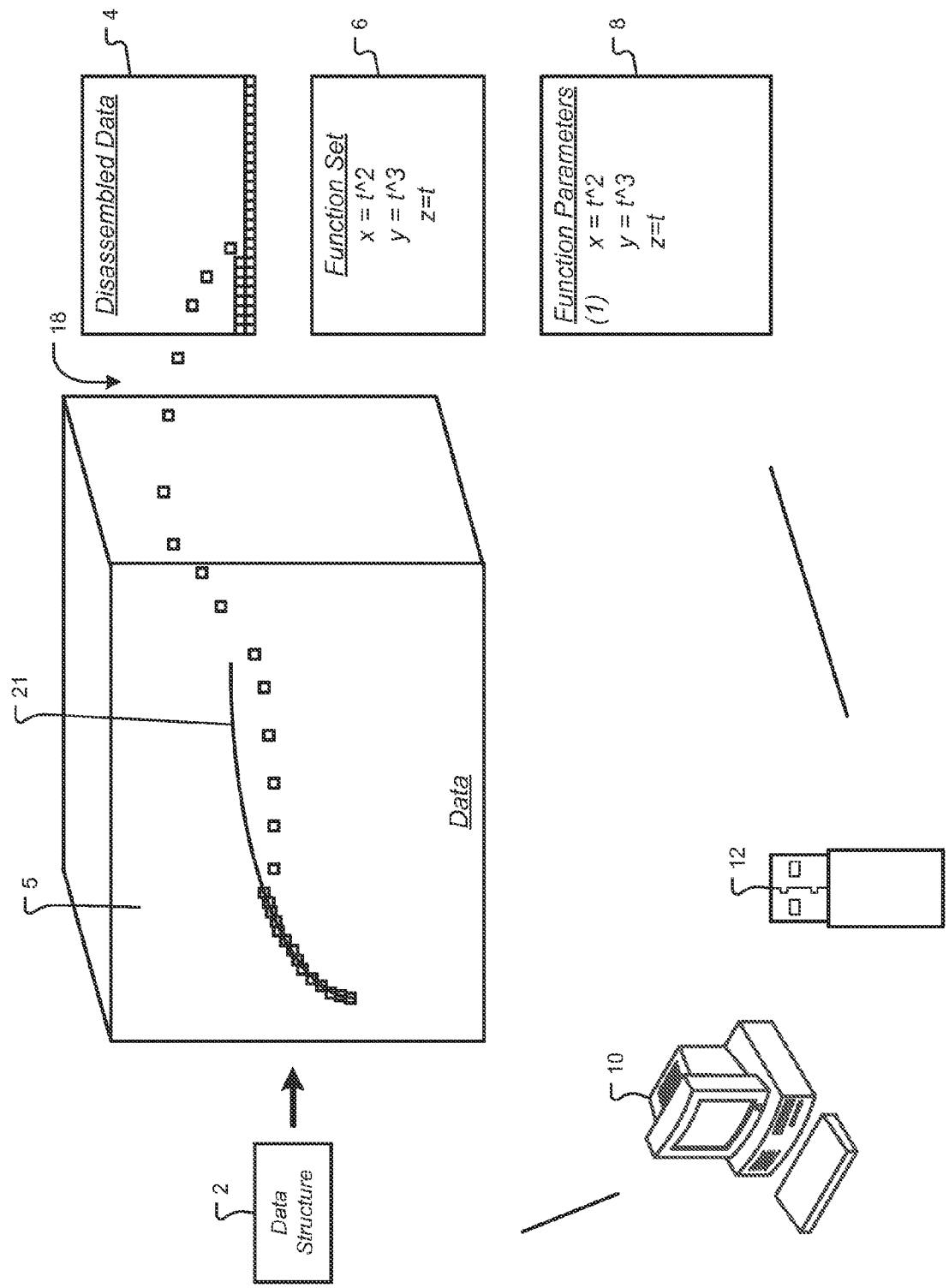
FIG. 6 is a diagram showing an example disassembly of a data structure using a three dimensional array.

In the example of FIGS. 1 and 2, the data structure 2 is aggregated into a two dimensional array 3. FIG. 6 is a diagram showing an example disassembly of a data structure 2 where the data structure 2 is organized into a three dimensional array 5. The array 5 is a rectangular array, although any other suitable type of array may be used. The array 5 may be disassembled and reassembled in any suitable manner including, for example, as described herein with respect to FIGS. 3, 4 and 5. Functions used to disassemble the three dimensional array 5 may be functions that return three dimensional coordinates according to any suitable coordinate system. For example, in FIG. 6, a function is applied given by Equations (4), (5) and (6) below:

$$x=t^2 \qquad (4)$$

$$y=t^3 \qquad (5)$$

$$z=t \qquad (6)$$

Function parameters for the example function include, a range given by an ordered set of values for t, offsets in the x, y, and z directions, various coefficients, etc. Function outline 21 shows the location of data units 18 that were or are to be transferred to the disassembled data 4.

Figure 7:
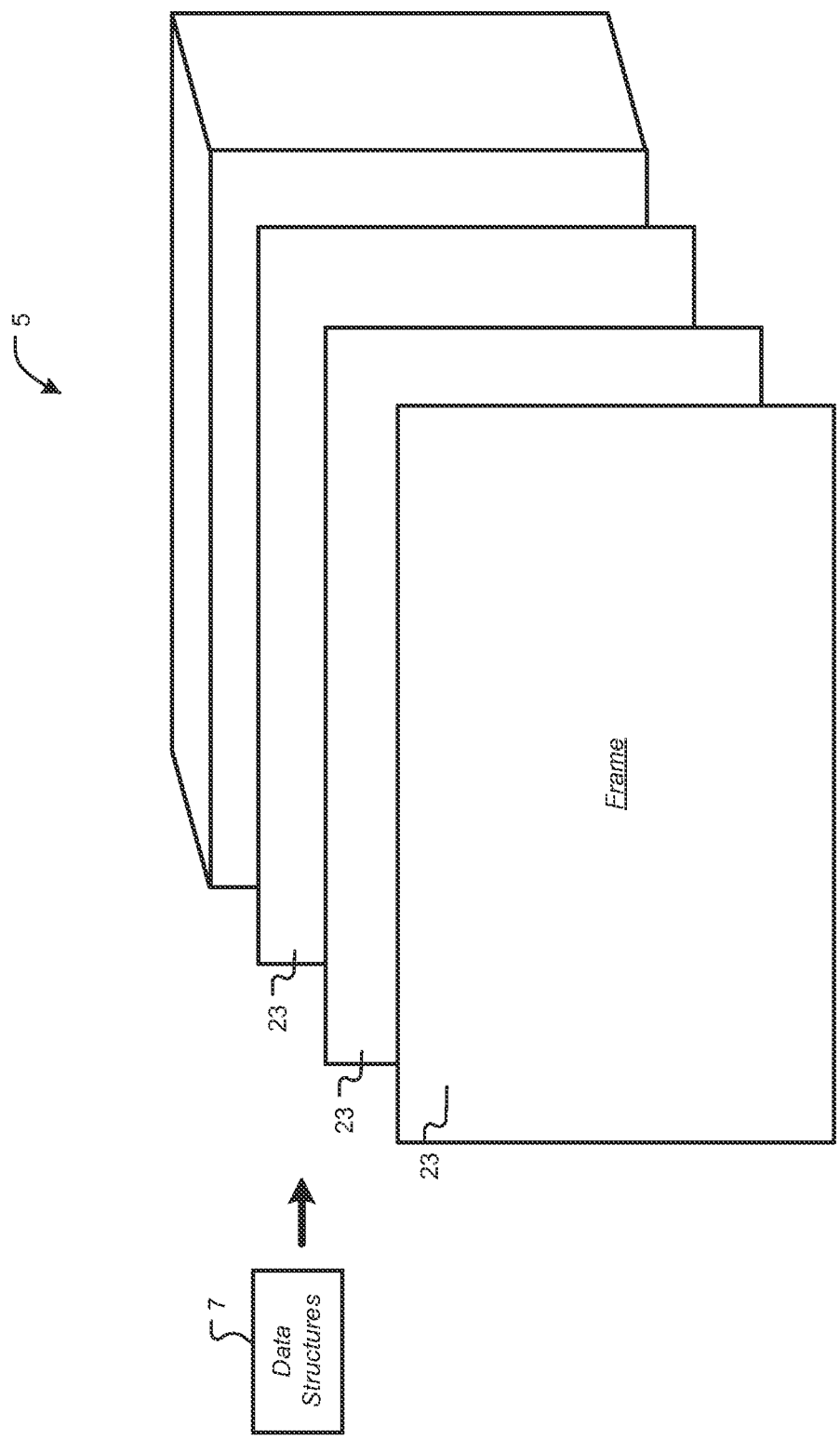
FIG. 7 shows an example of the three dimensional array generated from a data structure comprising a video file.

In some examples, a three or higher dimensional array may be applied to data structures having multiple dimensions to add additional security. For example, FIG. 7 shows an example of the three dimensional array 5 generated from a data structure 7 comprising a video file. The video file may comprise a plurality of frames 23. The frames 23 may be stacked to generate the array 5. When functions are applied to the array 5, for example, as described and shown in FIG. 6, data units from the various frames may be removed and placed at the disassembled data 4.

In various examples, disassembly and assembly may be applied in multiple stages. For example, referring to FIGS. 1 and 2 as an example, after an initial disassembly, the data array/remnant 3 and/or disassembled data 6 may be disassembled again, for example, with a new ordered set of functions. The original data structure 2 may be obtained, then, by reversing the multiple disassembly operations. Also, in some examples, a pair of data array/remnants or other disassembled components from multiple data structures may be aggregated into a new data array and disassembled. Similarly, the original data structure 2 may be obtained by reversing the final disassembly, disaggregating the multiple data structures, and then reversing the initial disassembly operations. Also, in some examples, assembly data, such as 8 above, may be disassembled, adding an additional layer of security.

In some examples, using a directory structure as the data structure 2 may enhance security. For example, when a directory structure is disassembled, file locations within the directory structure may be part of the disassembled data structure 2. In this way, it may be necessary to reassemble the directory structure to determine the location of specific files. Also, in some examples, a directory structure may be optimized for disassembly by including random files along with files that include useful information. Accordingly, the directory structure may need to be reassembled in order to distinguish between meaningful files and random files.

Figure 8:
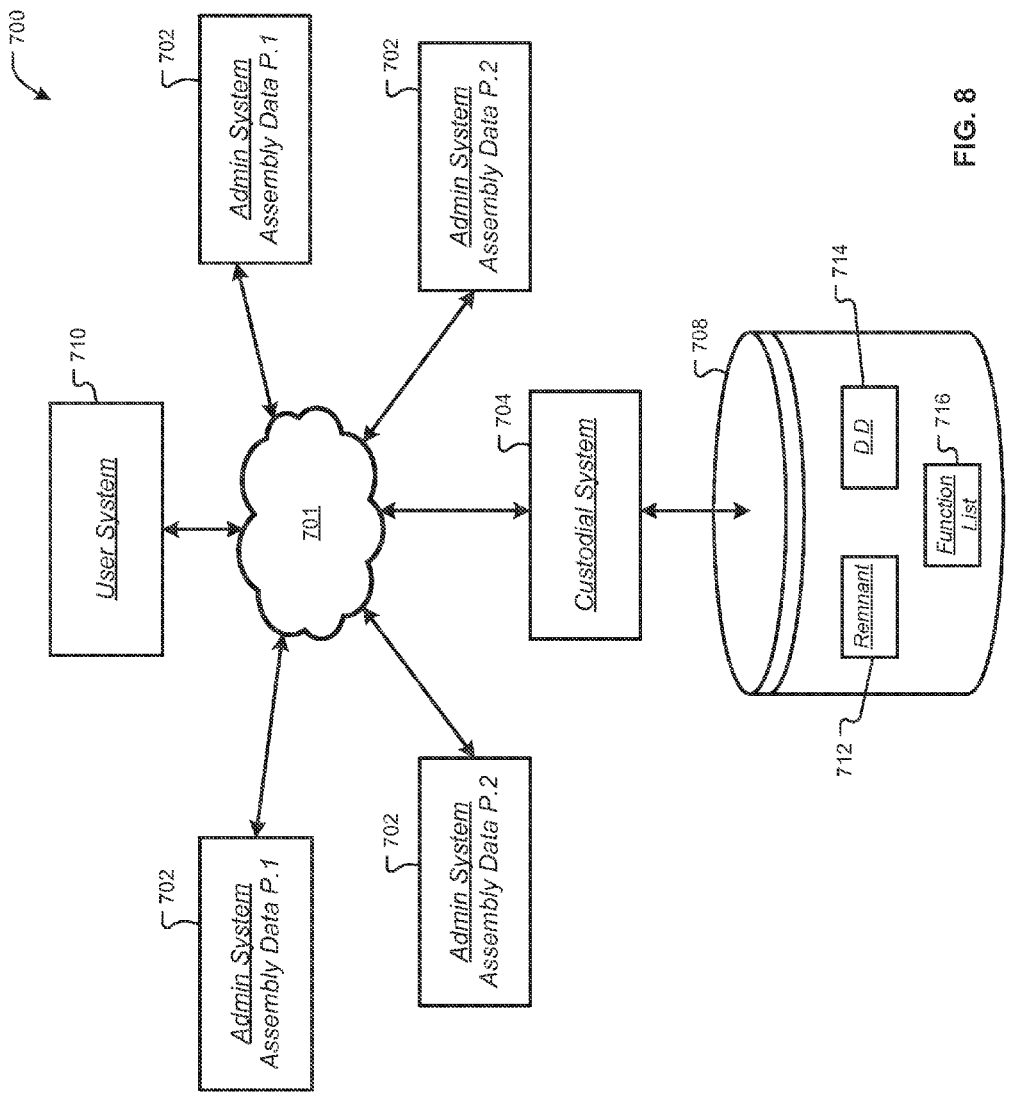
FIG. 8 is a diagram showing one example of an environment for storing disassembled data structures.

FIG. 8 is a diagram showing one example of an environment 700 for storing disassembled data structures. The environment 700 comprises a data store 708 that may have stored thereon one or more remnants 712 of data arrays, one or more data containers comprising disassembled data 714 and, optionally, one or more function lists 716. The data store 708 may be managed by a custodial system 704 that may comprise one or more servers or other computing devices. An optional user system 710 may also comprise one or more computing devices and may be configured to communicate with the custodial system 704 (and data store 708) via a network 701. The network 701 may comprise any suitable local area or wide area network utilizing wired technology, wired technology or a combination thereof. The user system 710 may access the data stored at the data store 708. Optional administrator systems 702 may also be in communication on the network 701.

In various examples, assembly and disassembly may be performed by the custodial system 704, the user system 710, one or more of the administrator systems 702, by a dongle (such as 12) installed at one or more of these systems, etc. Assembly data to reassemble the remnant 712 and disassembled data 714 may be stored at any suitable location. In some examples, the assembly data may be distributed among different administrative systems 702. For example, as illustrated in FIG. 8, some administrative systems 702 comprise a first part of the assembly data (P.1) while other administrative systems 702 comprise a second part of the assembly data (P.2). To reassemble the remnant 712 and disassembled data 714, the user system 710, custodial system 704 or other system may need to obtain all parts of the assembly data from the respective administrative systems 702. In this way, it may be necessary for a hacker to hack multiple systems before gaining the ability to reassemble the original data structure. In some examples, and as illustrated, each portion of the assembly data may be stored at more than one administrative system 702. In this way, failure of a single administrative system 702 may not prevent reassembly of the original data structure.

Figure 9:
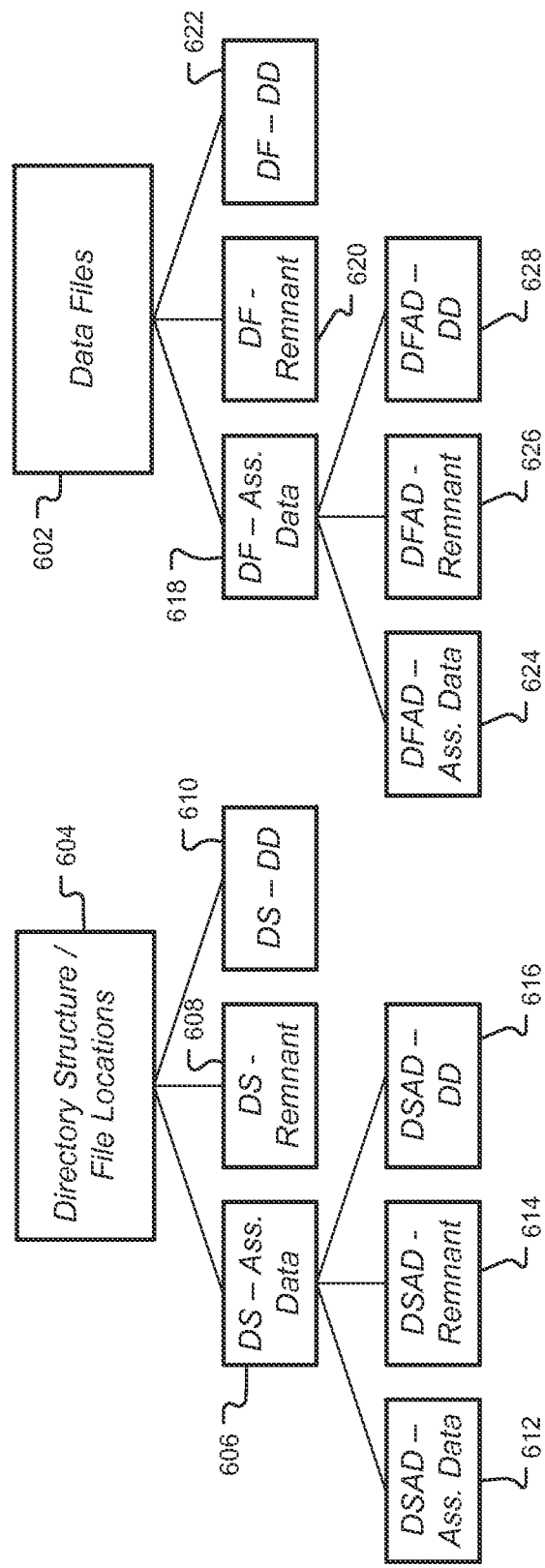
FIG. 9 is a block diagram illustrating an example method for disassembling data structures.

FIG. 9 is a block diagram 600 illustrating an example method for disassembling data structures. In FIG. 9, a data structure comprising a directory structure 604 and data files 602 stored according to the directory structure 604 is disassembled separately. The data files 602 are disassembled, as described herein, yielding a remnant 620, disassembled data 622 and assembly data 618. Optionally, the assembly data 618 may be separately disassembled, yielding a remnant 626, disassembled data 628 and assembly data 624. The directory structure 604 may be separately disassembled, yielding a remnant 608, disassembled data 610 and assembly data 606. Optionally, the assembly data 606 may be separately disassembled, yielding a remnant 614, disassembled data 616 and assembly data 612.

In various examples, the data files 602 may not be readable without the directory structure 604 to identify file locations. Accordingly, additional security may be had by distributing the components necessary to reassemble the data files 602 (e.g., 618, 620, 622) and the components necessary to reassemble the directory structure (e.g., 606, 608, 610) among different systems, such as different administrator system 702. In some examples, security may be further enhanced by distributing the components necessary to reassemble the assembly data 618 (e.g., 624, 646, 628) and the components necessary to reassemble the assembly data 606 (e.g., 612, 614, 616) across different systems.

Figure 10:
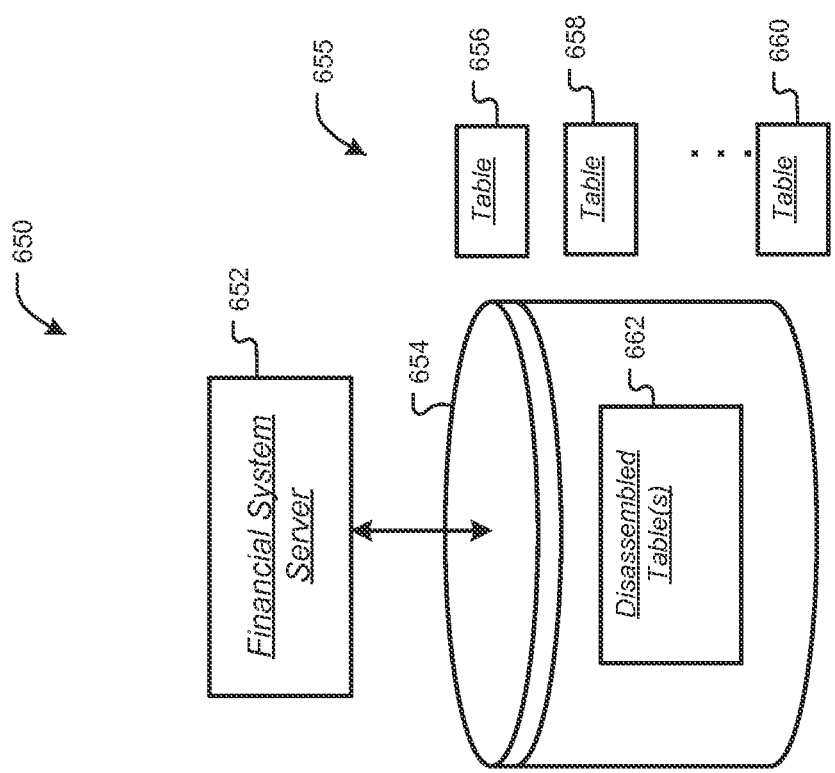
FIG. 10 is a diagram showing one example of a financial institution account system.

Data disassembly and assembly, as described herein, may be used in any situation where there is a need to secure data. In some examples, data disassembly and assembly may be utilized by financial institutions, such as banks or credit card issuers, to process sensitive account data. FIG. 10 is a diagram showing one example of a financial institution account system 650. The system 650 may comprise one or more financial system servers 652 that may administer one or more data stores 654. The data store 654 may comprise account information 655. In some examples, the account information 655 may be stored as one or more relational database tables 656. The tables 656 may be disassembled and stored at the data store 654 as disassembled tables.

Figure 11:
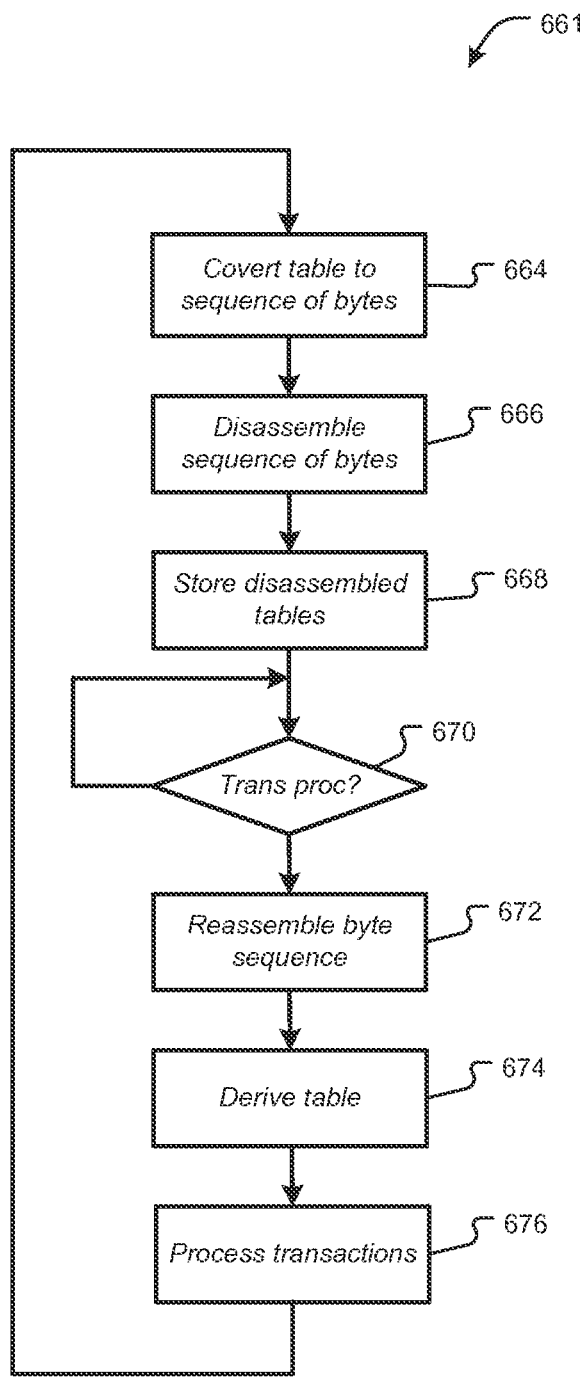
FIG. 11 is a flow chart showing one example of a process flow that may be executed by the financial system server to manage the account information.

FIG. 11 is a flow chart showing one example of a process flow 661 that may be executed by the financial system server 652 to manage the account information. The process flow 652 is described in the context of a single database table 656. In some examples, however, the server 652 may handle multiple tables 656 according to the process flow 661, or a similar process flow, either in parallel or serial. At 664, the server 652 may convert a table 656 to a sequence of bytes using any suitable technique. For example, the table 656 may be converted into an array, which may be expressed as a sequence of bytes. Also, in some examples, the table 656 may be serialized into a string of characters. At 666, server 652 may disassemble the sequence of bytes, for example, as described herein. At 668, the server 652 may store the disassembled sequence of bytes at the data store 654. At 670, the server 652 may determine if it is time to process transactions for accounts described by the table 656. For example, the table 656 may be processed a predetermined number of times per day at predefined times. Also, for example, the table 656 may be processed when a transaction for an account stored at the table 656 is pending.

If the interval for processing the table 656 has passed, the server 652 may reassemble the byte sequence at 672 and derive the table 656 at 674. At 676, the server 652 may process at least one transaction for accounts stored at the table 656. The server 652 may process a single transaction directed to a single account, or may execute batch processing of multiple transactions directed to one or more accounts. When account processing is complete, the table may again be converted and disassembled until the next time for processing transactions is reached. In this way, the table 656 may be stored at the data store 654 only in unreadable disassembled form. Although FIGS. 10 and 11 are described in the context of a financial institution account system 650, the systems and methods described are applicable to any suitable database or other data storage system including, for example, data storage systems subject to periodic processing.

Figure 12:
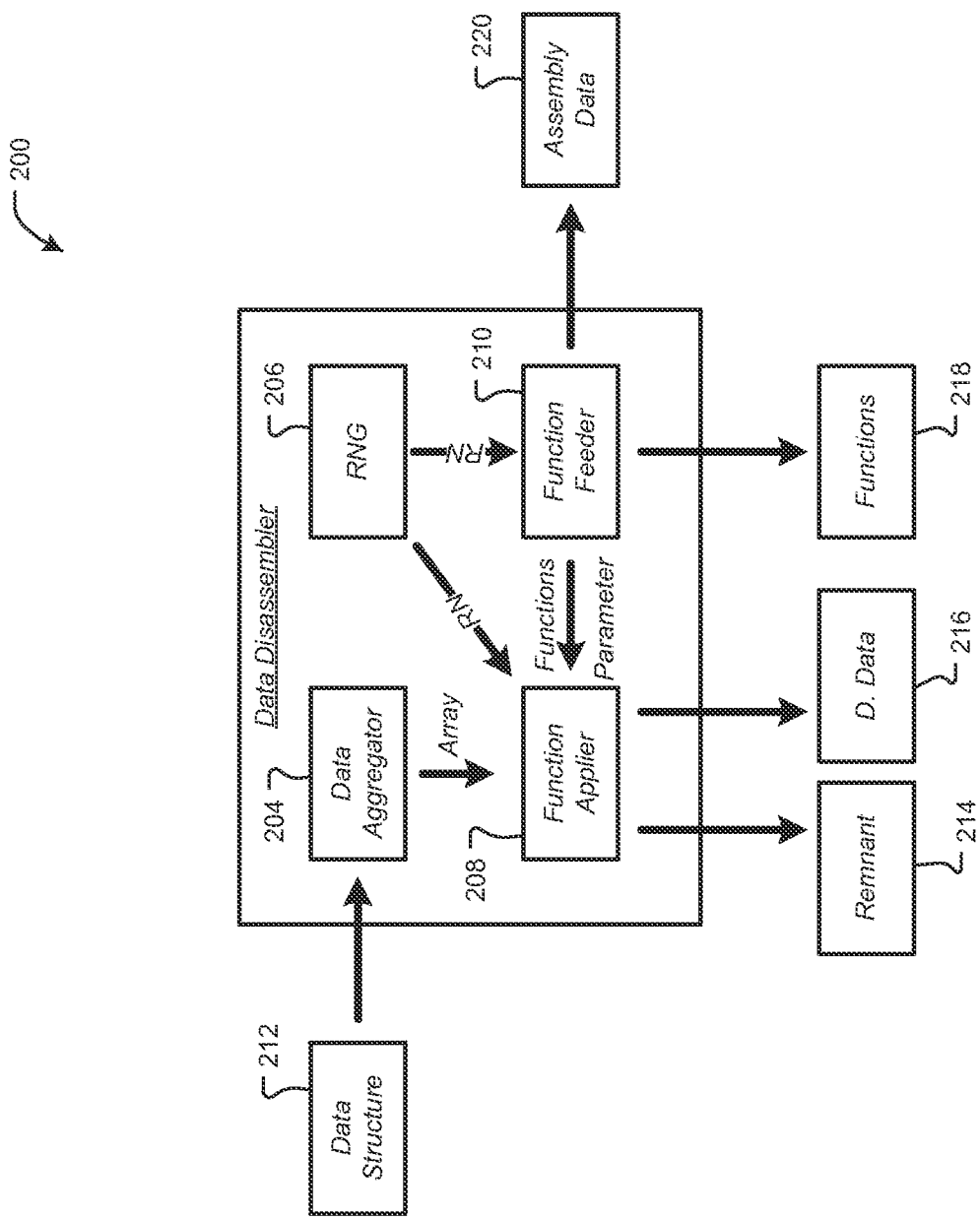
FIG. 12 is a diagram showing one example of a data disassembler device that may be used to disassemble a data structure as described herein.

FIG. 12 is a diagram showing one example of a data disassembler device 200 that may be used to disassemble a data structure 212 as described herein. The data disassembler comprises a data aggregator 204, a function applier 208, a function feeder 210 and a random number generator 206. The data aggregator 204 may receive a data structure 212 and express the data structure as a multi-dimensional array, for example, as described herein with respect to the process flow 60. The data aggregator 204 may be implemented in any suitable combination of hardware and/or software. For example, the data aggregator 204 may comprise one or more shift registers, control logic, or other suitable hardware. In some examples, the data aggregator 204 may be implemented partially or completely by a programmed processor. A function applier 208 may receive the array from the data aggregator and apply functions to the array, for example, as described herein. The output of the function applier 208 may include a remnant 214 of the array and disassembled data 216. The array, remnant 214, and disassembled data 216 may be similar to the array 3, remnant of the array 3 and disassembled data 4 described herein above. The function applier 208 may be implemented in any suitable combination of hardware and/or software. For example, the function applier 208 may comprise one or more shift registers, one or more multipliers, one or more adders, or any other suitable logic. Also, in some examples, the function applier 208 may be implemented partially or completely by a programmed processor.

A function feeder 210 may feed functions to the function applier 208 for application. For example, the function feeder 210 may randomly select functions and function parameters to be applied. In some examples, functions may be selected from a prepopulated list of functions. The function feeder 210 may also write the functions and function parameters that it provides to the function applier 208 to assembly data 220. An optional function list 218 may also be generated and may be stored with the remnant 214 and disassembled data 216, for example, as described above with respect to the function list 6. The function feeder 210 may be implemented in any suitable combination of hardware and/or software. For example, the function feeder 210 may comprise one or more shift registers, control logic, etc. In some examples, the function feeder 210 may be implemented partially or completely be a programmed processor. A random number generator 206 may provide random numbers to the function applier 208 and/or the function feeder 210. The function applier 208 may utilize the random numbers, for example, to replace data units in the array. The function feeder 210 may utilize the random numbers, for example, to select functions, to select function parameters, etc. The random number generator 206 may be implemented in any suitable combination of hardware and/or software. For example, the random number generator 206 may comprise one or more true random number generators, control logic, etc. Also, in some examples, the random number generator 206 may be implemented partially or completely by a programmed processor.

Figure 13:
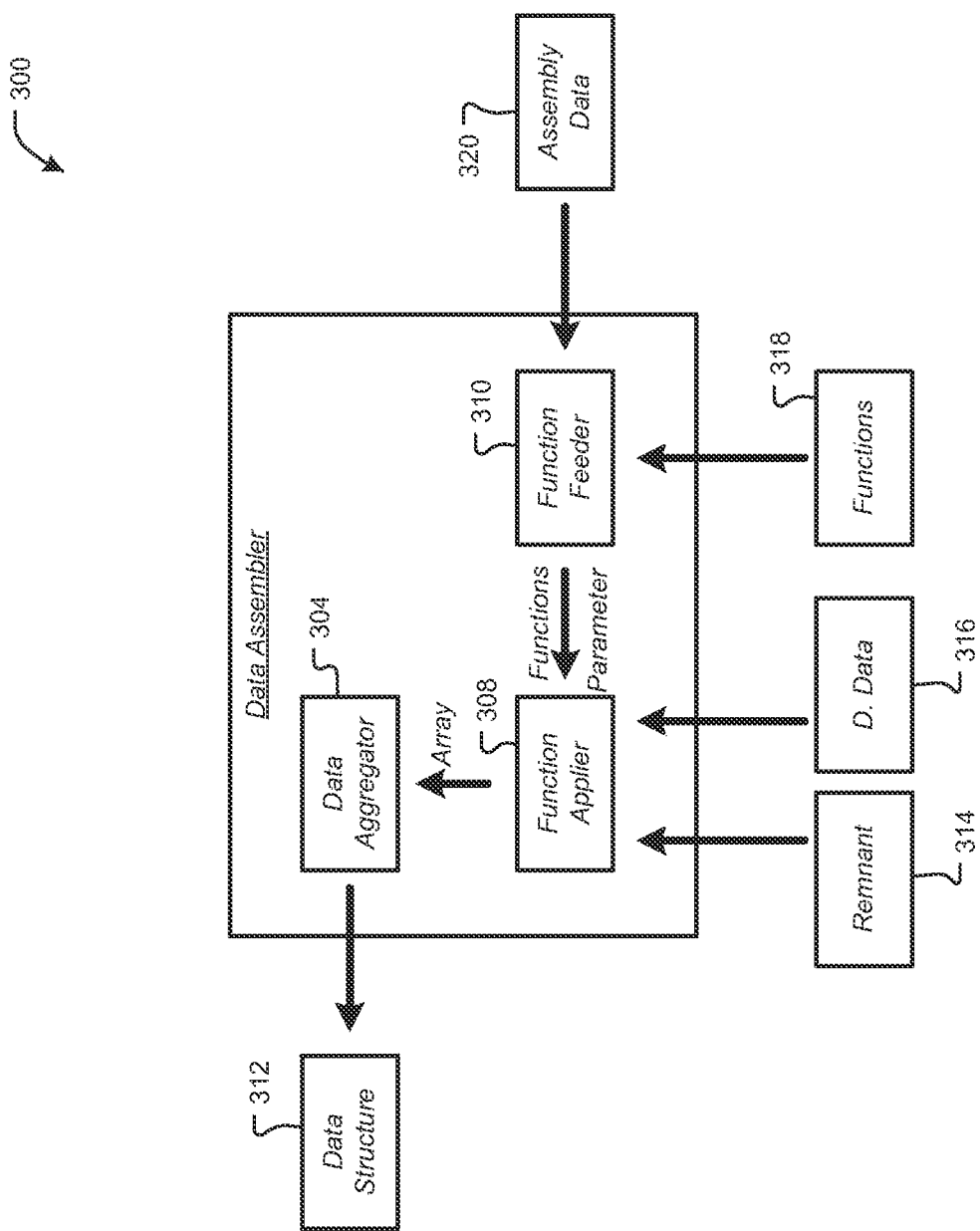
FIG. 13 is a diagram showing one example of a data assembly device that may be used to assemble a data structure, as described herein.

FIG. 13 is a diagram showing one example of a data assembly device 300 that may be used to assemble a data structure, as described herein. A function feeder 310 may receive functions 318 and assembly data 310 which may enable the function feeder 310 to generate an ordered set of functions with associated parameters that may be provided to the function applier 308. The function feeder 310 may be implemented in any suitable combination of hardware and/or software. For example, the function feeder 310 may comprise one or more shift registers, control logic, etc. In some examples, the function feeder 210 may be implemented partially or completely be a programmed processor. The function applier 308 may apply the received functions to the remnant 314 and disassembled data 316, for example, as described herein to generate the assembled data array. The function applier 308 may be implemented in any suitable combination of hardware and/or software. For example, the function applier 308 may comprise one or more shift registers, one or more multipliers, one or more adders, or any other suitable logic. Also, in some examples, the function applier 308 may be implemented partially or completely by a programmed processor. The array may, optionally, be provided to a data aggregator 304, which may, if necessary, convert the array to the original data structure 312. The data aggregator 304 may be implemented in any suitable combination of hardware and/or software. For example, the data aggregator 304 may comprise one or more shift registers, combinatory logic, or other suitable hardware. In some examples, the data aggregator 304 may be implemented partially or completely by a programmed processor.

Figure 14:
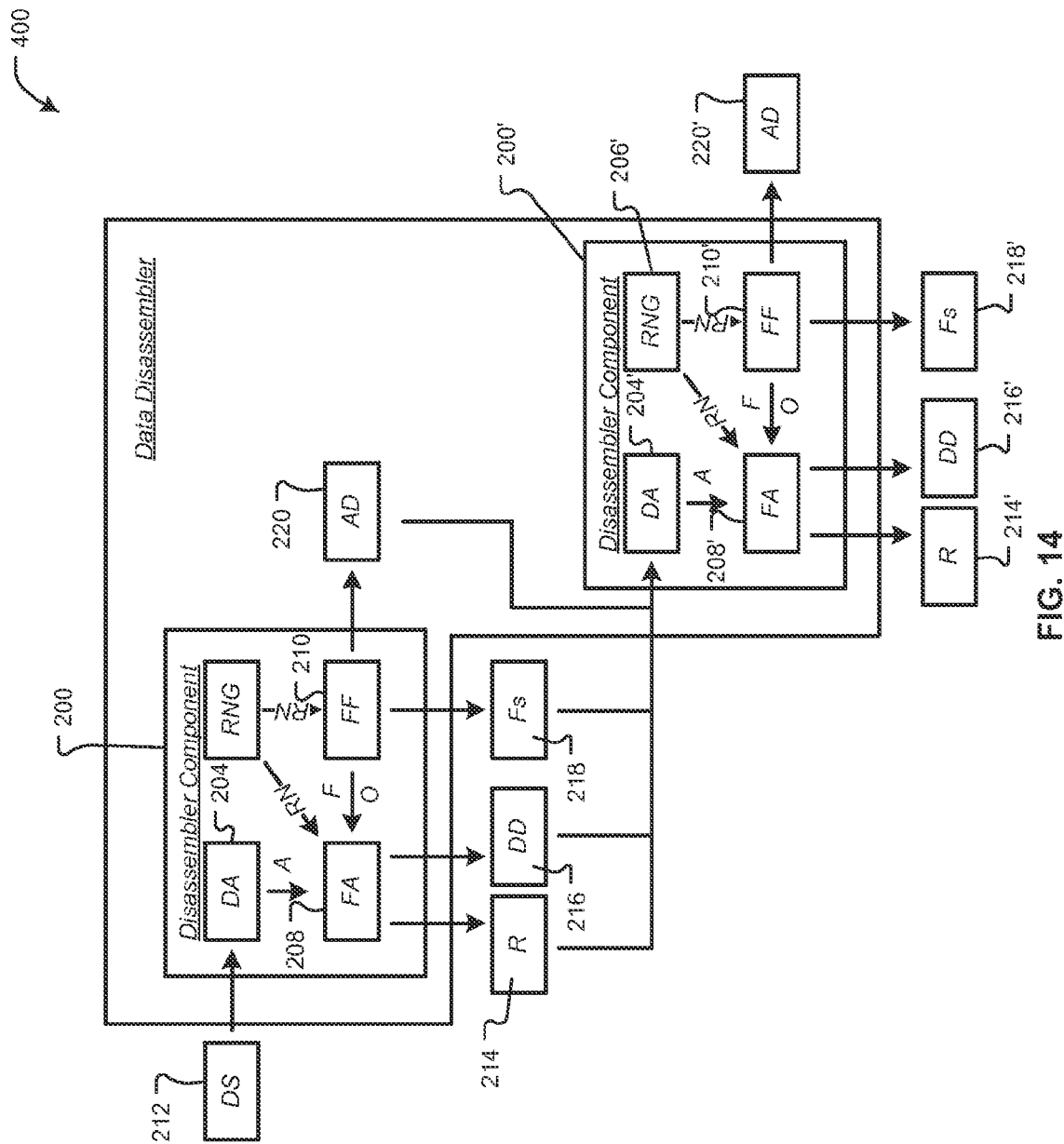
FIG. 14 is a diagram showing one example of a two-stage data disassembly device that may be used to disassemble a data structure, as described herein.

FIG. 14 is a diagram showing one example of a two-stage data disassembly device 400 that may be used to disassemble a data structure, as described herein. The disassembly device 400 may comprise data disassembler components 200, 200' similar to the data disassembler device 200 described herein above. For example, the disassembler components may comprise data aggregators 204, 204', function appliers 208, 208', function feeders 210, 210', and random number generators 206, 206'. The disassembler component 200 may disassemble a data structure 212. One or more of the outputs of the data disassembler 200 may be provided to the disassembler component 200'. For example, the outputs of the data disassembler 200 provided as input to the disassembler component 200' may include the remnant 214, the disassembled data 216, the function set 218, and/or the assembly data 220. The ordered set of functions applied by the disassembler component 200' may be the same set applied by the disassembler component 200 or a different set. The output of the disassembler component 200' may be a remnant 214', disassembled data 216' and, optionally, a list of functions 218'. The remnant 214' and disassembled data 216' may be reassembled in stages to generate the original data structure 212. For example, the remnant 214' and disassembled data 216' may be reassembled into the originally disassembled remnant 214 and/or disassembled data 216 which may, in turn, by reassembled into the original data structure 212.

Figure 15:
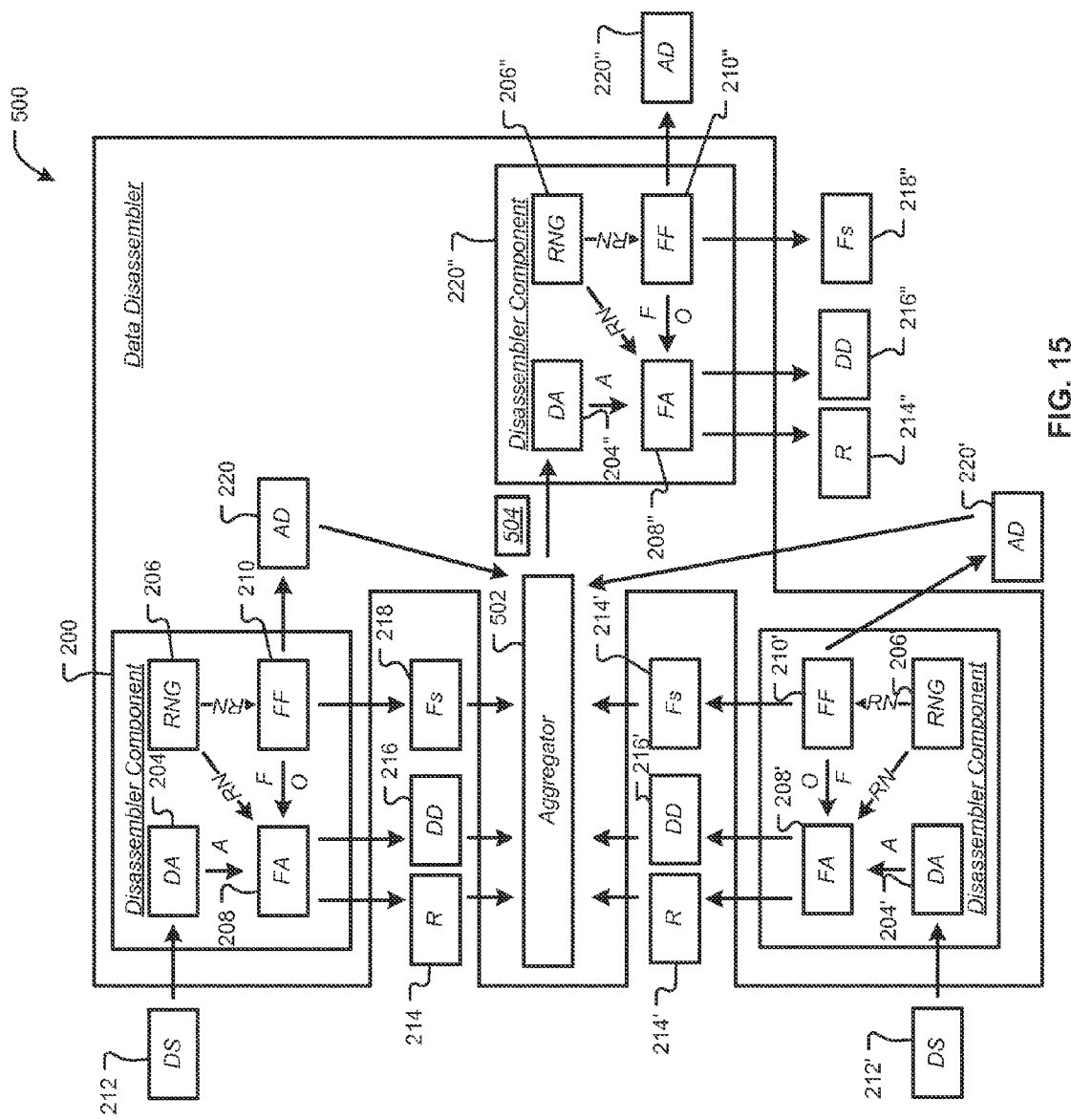
FIG. 15 is a diagram showing one example of a multi-stage data disassembly device that may be used to disassemble a pair of data structures.

FIG. 15 is a diagram showing one example of a multi-stage data disassembly device 500 that may be used to disassemble a pair of data structures 212, 212', as described herein. The multi-stage data disassembly device 500 may comprise a pair of first stage disassembler components 200, 200' and a second stage disassembler component 200". The disassembler components 200, 200', 200" and their respective sub-components 204, 204', 204", 206, 206', 206", 208, 208', 208", 210, 210', 210", etc. may operate as described herein with respect to FIG. 13. The first stage disassembler components 200, 200' may disassemble respective data structures 212, 212'. Disassembler component 200 may generate from the data structure 212 a remnant 214, disassembled data 216, assembly data 220, and optional function list 218. Disassembler component 200' may generate from the data structure 212' a remnant 214', disassembled data 216', assembly data 220', and optional function list 218'.

The outputs, in various combinations, may be provided to an aggregator 502. The aggregator 502 may be configured to aggregate at least a portion of the outputs 214, 216, 218, 220 of the disassembler component 200 with at least a portion of the outputs 214', 216', 218', 220' of the disassembler component 200'. Any suitable aggregation operation application may be used. For example, the various components may be interlaced or appended to one another in any manner. The aggregator 502 may be implemented in any suitable combination of hardware and/or software. For example, the aggregator 502 may comprise one or more shift registers, control logic, or other suitable hardware. In some examples, the aggregator 502 may be implemented partially or completely by a programmed processor. The output 504 of the aggregator 502 may be provided to the second stage disassembler component 200". The second stage disassembler component 200" may disassemble the output 504, as described herein, generating an aggregated remnant 214", aggregated disassembled data 216" and, optionally, an aggregated function list 218". The second stage disassembler component 200" may additional generate assembly data 220" that may be used to re-assemble the remnant 214" and disassembled data 216" to recreate the output 504. The output 504 may then be disaggregated by reversing the process of the aggregator 502 to generate the outputs of the components 200, 200' that were provided to the aggregator 502. Those outputs may be assembled utilizing respective assembly data 220, 220', resulting in the original data structure 212, 212'.

Figure 16:
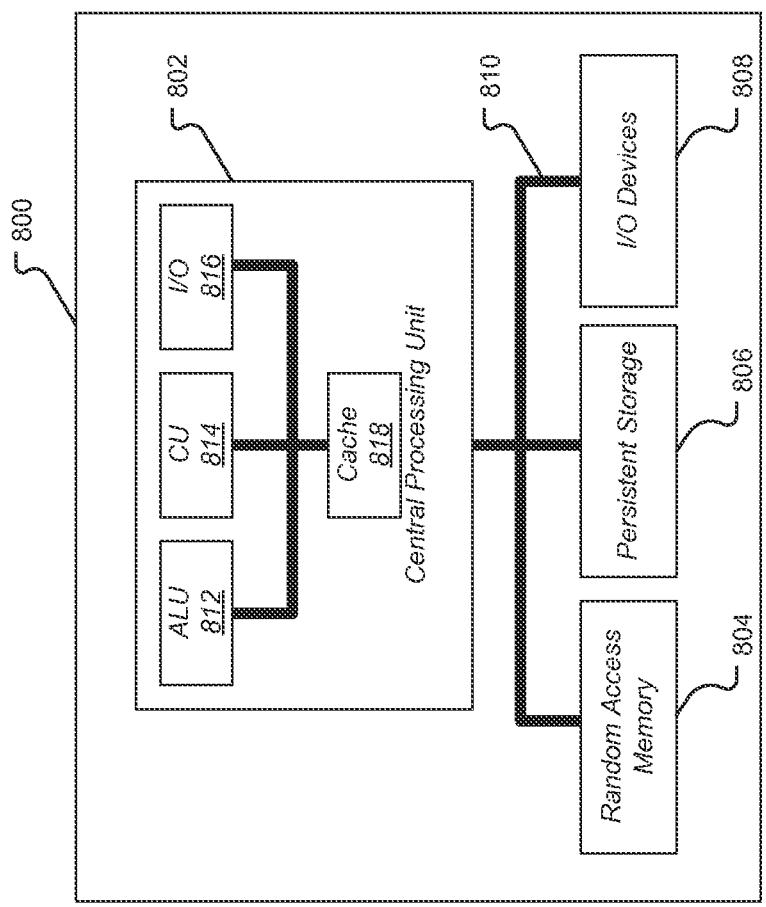
FIG. 16 is a block diagram showing one example of a computer system that may be utilized to implement some or all of the components of the various data disassemblers and data assemblers described herein.

FIG. 16 is a block diagram showing one example of a computer system 800 that may be utilized to implement some or all of the components of the various data disassemblers 200, 400, 500 and data assemblers 300 described herein. For example, the computer system 800 may be an implementation of the computer system 10 described above. The computer system 800 comprises a central processing unit (CPU) 802, a random access memory 806, and various input/output (I/O) devices 808. The various components 804, 806, 808 may be in communication with one another via one or more busses such as bus 810.

The CPU 802 may comprise an arithmetic and logic unit (ALU) 812, a control unit 814, cache memory 818, and an input and output I/O control 816. These components can be interconnected by a bus or busses 820, often comprising groups of wires or cables. The control unit 814, ALU 812 and basic I/O control (and sometimes other hardware closely linked with these sections) can be collectively considered the central processing unit (CPU) 802 for the computer system 800. The CPU 802 may be constructed on a single integrated circuit or microprocessor.

The control unit 814 (control system or central controller) may direct the various components of the computer system 800. For example, the control unit 814 may decode each instruction in a computer program and turn it into a series of control signals that operate other components of the computer system 800. To enhance performance or efficiency of operation, the control unit may, in some examples, alter the order of instructions. In some examples, the control unit 814 may comprise a program counter and a memory register that tracks the location in memory from which the next instruction is to be read.

The ALU 812 may be capable of performing arithmetic and logic operations. The set of arithmetic operations that a particular ALU 812 supports may be limited to adding and subtracting or might include multiplying or dividing, trigonometry functions (sine, cosine, etc.) and square roots. Some examples of the ALU 812 may be programmed to operate on whole numbers (integers), while others may use floating point representations of real numbers, for example. The ALU 812 may also compare numbers and return Boolean truth values (e.g., true or false). Some examples of the system 800, such as those implementing superscalar computers, may contain multiple ALUs 812 to facilitate processing multiple instructions at the same time. For example, graphics processors and computers with Simple Instruction Multiple Data (SIMD) and/or Multiple Instruction Multiple Data (MIMD) features often possess ALU's 812 that can perform arithmetic operations on vectors and matrices. Some examples of the computer system 800 may include one or more RAM cache memories 818 configured to move more frequently needed data into the cache automatically.

Some examples described herein may comprise multiple CPU's 802. For example, functions may be divided between separate CPU's 802, creating a multiprocessing configuration. For example, multiprocessor and multi-core (multiple CPUs on a single integrated circuit) computer systems with co-processing capabilities may be employed. Also, multi-tasking may be employed as a computer processing technique to handle simultaneous execution of multiple computer programs.

Random access memory 804 may comprise any suitable type of memory including, for example, Dynamic Random Access Memory (DRAM), Double Data Rate Synchronous Dynamic Random Access Memory (DDR SDRAM). Persistent storage 806 may comprise any type of persistent storage device including, for example, a single fixed disk drive, an array of disk drives, an array of disk drives combined to provide the appearance of a larger, single disk drive, a solid state drive (SSD), etc. I/O devices 808 may, for example, be managed by the I/O control 816 and may include, for example, keyboards, mice, screen displays, monitors, printers, hard disk drives, floppy disk drives, joysticks, and image scanners.

Figure 17:
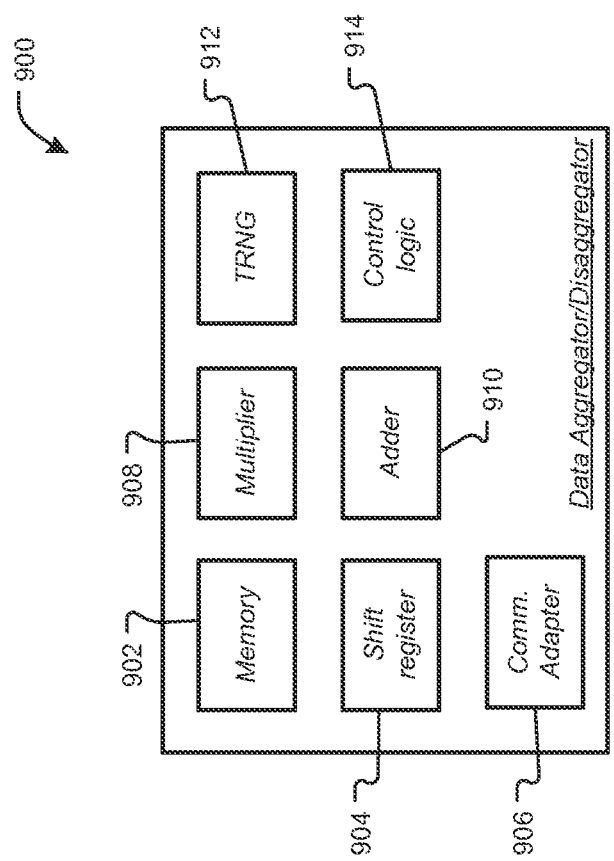
FIG. 17 is a block diagram showing one example of a hardware device that may be utilized to implement some or all of the components of the various data disassemblers and data assemblers described herein.

FIG. 17 is a block diagram showing one example of a hardware device 900 that may be utilized to implement some or all of the components of the various data disassemblers and data assemblers described herein. For example, the device 900 may be all or a portion of a dongle 12 or other hardware device for implementing data disassembly and/or assembly. The device 900 may comprise a memory 902. The memory 902 may comprise any suitable type of memory including, for example, Dynamic Random Access Memory (DRAM), Double Data Rate Synchronous Dynamic Random Access Memory (DDR SDRAM). The device 900 may also comprise one or more shift registers 904. Shift registers 904 may be utilized to store data units or portions thereof and/or to perform or manage operations on data units. One or more multipliers 908 and/or adders 910 may be utilized to perform operations on data units such as, for example, to apply functions as described herein. A true random number generator 912 may generate random numbers that may be used, as described herein, to replace data units at the multi-dimensional array, select functions to be applied, etc. Control logic 914 may comprise any suitable combination of logic gates or other components to control and coordinate the operation of the remaining components. A communication adapter 906 may facilitate communication between the device 900 and other components (e.g., a computer system, such as the computer system 800). For example, when the device is implemented on an Universal Serial Bus (USB) dongle, such as 12, the communication adapter 906 may be a USB communication adaptor.

In various examples, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various examples of the invention. In certain examples, a "module" may include software, firmware, hardware, or any reasonable combination thereof.

Various examples of the systems and methods may include and/or utilize a computer or computer system. In various examples, a computer may be in communication with a server or server system utilizing any suitable type of communication including, for example, wired or wireless digital communications. In some examples, the server or server system may be implemented as a cloud computing application and/or in a similar manner and may provide various functionality of the systems and methods as SaaS.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present examples may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed examples. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various examples, a "host," "engine," "loader," "filter," "platform," or "component" may include various computers or computer systems, or may include a reasonable combination of software, firmware, and/or hardware.

In various examples of the present invention, a single component may be replaced by multiple components, and multiple components may be replaced by a single component, to perform a given function or functions. Except where such substitution would not be operative to practice examples of the present invention, such substitution is within the scope of the present invention.

In general, it may be apparent to one of ordinary skill in the art that various examples described herein, or components or parts thereof, may be implemented in many different examples of software, firmware, and/or hardware, or modules thereof. The software code or specialized control hardware used to implement some of the present examples is not limiting of the present invention. For example, the examples described hereinabove may be implemented in computer software using any suitable computer programming language such as SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include SQL, MySQL, Bourne script, JavaScript, Python, Ruby, PHP, and Perl. Such software may be stored on any type of suitable computer-readable medium or media such as, for example, a magnetic medium, an optical storage medium, non-volatile random access memory (NVRAM), etc. Thus, the operation and behavior of the examples are described without specific reference to the actual software code or specialized hardware components. The absence of such specific references is feasible because it is clearly understood that artisans of ordinary skill would be able to design software and control hardware to implement the examples of the present invention based on the description herein with only a reasonable effort and without undue experimentation.

Various examples of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Examples of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various examples, local bridges may be employed to directly connect local area networks (LANs); remote bridges can be used to create a wide area network (WAN) link between LANs; and/or, wireless bridges can be used to connect LANs and/or to connect remote stations to LANs.

In various examples, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is, in turn, connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain examples, routers or other like networking devices may be used to forward data packets between networks using headers and forwarding tables to determine an optimum path through which to transmit the packets.

In various examples, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various examples have been described herein, it should be apparent, however, that various modifications, alterations and adaptations to those examples may occur to persons skilled in the art with the attainment of some or all of the advantages of the invention. The disclosed examples are therefore intended to include all such modifications, alterations and adaptations without departing from the scope and spirit of the invention.

We claim:

1. A computer-implemented method, the method comprising:
    receiving, by at least one processor, a multi-dimensional array comprising a plurality of data units, wherein each of the plurality of data units is associated with a unique coordinate set, and wherein an order of the data units in the array corresponds to a data structure;
    applying a first function to the array, by the at least one processor, wherein the first function is selected from an ordered set of functions, wherein applying the first function comprises:
        applying a first range value from an ordered set of range values for the first function to generate a first coordinate set;
        moving a first data unit in the array at a location described by the first coordinate set to a disassembled data container;
        applying a second range value from the ordered set of range values for the first function lo generate a second coordinate set, wherein the second range value is positioned immediately after the first range value according to the ordered set of range values; and
        moving a second data unit in the array at a location described by the second coordinate set to the disassembled data container in a position immediately after a position of the first data unit;
    applying a second function to the array, by the at least one processor, wherein the second function is selected from the ordered set of functions, and wherein the second function is positioned immediately after the first function according to the ordered set of functions;
    storing, by the processor, the array and the disassembled data container; and reassembling the data structure, wherein reassembling the data structure comprises:
        applying a last function from the ordered set of functions to the array and the disassembled data container, wherein the last function is a final function that was applied during disassembly of the data structure, and wherein applying the last function comprises:
            applying a last range value from an ordered set of range values for the last function to generate a last coordinate set, wherein the last range value is a final range value that was used to apply the last function during disassembly of the data structure;
            moving a last data unit from the disassembled data container to a location at the array described by the last coordinate set, wherein the last data unit is a final data unit written to the disassembled data container during disassembly of the data structure;
            applying a next-to-last range value from the ordered set of range values for the last function to generate a next-to-last coordinate set, wherein the next-to-last range value was used to apply the last function immediately before the last range value was used during disassembly of the data structure; and
            moving a next-to-last data unit from the disassembled data container to a location at the array described by the next-to-last coordinate set, wherein the next-to-last data unit is immediately prior to the last data unit at the disassembled data container; and
        applying a next-to-last function from the ordered set of functions to the array and the disassembled data container, wherein the next-to-last function was applied during disassembly of the data structure immediately before the last function.

2. The method of claim 1, wherein applying the first function to the array further comprises writing replacement data to the array at the location described by the first coordinate set.

3. The method of claim 2, further comprising randomly generating the replacement data.

4. The method of claim 1, wherein the array is a two dimensional array.

5. The method of claim 1, further comprising writing the first function and the ordered set of range values to an assembly data container.

6. The method of claim 1, wherein applying the first function to the array comprises applying the first function to the array according to at least one function parameter selected from the group consisting of an offset and a coefficient.

7. The method of claim 1, wherein the data structure comprises at least one of a file and a directory structure.

8. The method of claim 1, further comprising encrypting the data structure.

9. The method of claim 1, further comprising encrypting the array after applying the first function and the second function.

10. The method of claim 1, wherein the array is a three-dimensional array.

11. The method of claim 10, wherein the data structure is a movie file comprising a plurality of two-dimensional frames, and further comprising stacking, by the at least one processor, the plurality of two-dimensional frames to generate the three-dimensional array.

12. The method of claim 1, wherein the data structure is a directory structure, and further comprising disassembling a second data structure, wherein the second data structure comprises data files stored according to the directory structure.

13. The method of claim 1, further comprising providing, by the at least one processor, a first portion of the ordered set of functions to a first administrative system and a second portion of the ordered set of functions to a second administrative system.

14. The method of claim 1, further comprising:
merging, by the at least one processor, the disassembled data structure with a second data structure to form a combined data structure; and
disassembling the combined data structure.

15. A computer-implemented method for managing data security, the method comprising:
receiving, by at least one processor, a data structure wherein the data structure comprises a plurality of data units, and wherein each of the plurality of data units is associated with a unique coordinate set;
applying a first function to the data structure, by the at least one processor, wherein the first function is selected from an ordered set of functions, wherein applying the first function comprises:
applying a first range value from an ordered set of range values for the first function to generate a first coordinate set;
moving a first data unit in the data structure at a location described by the first coordinate set to a disassembled data container;
applying a second range value from the ordered set of range values for the first function to generate a second coordinate set, wherein the second range value is positioned immediately after the first range value according to the ordered set of range values; and
moving a second data unit in the data structure at a location described by the second coordinate set to the disassembled data container in a position immediately after a position of the first data unit;
applying a second function to the data structure, by the at least one processor, wherein the second function is selected from the ordered set of functions, and wherein the second function is positioned immediately after the first function according to the ordered set of functions;
storing, by the processor, the data structure and the disassembled data container; reassembling the data structure using the ordered set of functions and the disassembled data container, wherein the reassembling comprises:
applying a last function from the ordered set of functions to the data structure and the disassembled data container, wherein the last function is a final function that was applied during disassembly of the data structure, and wherein applying the last function comprises:
moving a last data unit form the disassembled data container to a location at the data structured described by the last coordinate set, wherein the last data unit is a final data unit written to the disassembled data container during disassembly of the data structure;
applying a next-to-last range value from the ordered set of range values for the last function to generate a next-to-last coordinate set, wherein the next-to-last range was used to apply the last function immediately before the last range value was used during disassembly of the data structure; and
moving a next-to-last data unit from the disassembled data container to a location at the data structure described by the next-to-last coordinate set, wherein the next-to-last data unit is immediately prior to the last data unit at the disassembled data container; and
applying a next-to-last function from the ordered set of functions to the data structure and the disassembled data container, wherein the next-to-last function was applied during disassembly of the data structure immediately before the last function;
modifying the reassembled data structure to indicate at least one transaction to at least one account described by the data structure; and
disassembling the modified data structure.

16. The method of claim 15, wherein the data structure comprises a database table.

17. The method of claim 15, wherein the data structure comprises financial account data, and wherein modifying the reassembled data structure comprises processing at least one account transaction.

18. A machine for disassembling a data structure, the machine comprising:
a data aggregator configured to receive a data structure and express the data structure as a multidimensional array, the multidimensional array comprising a plurality of data units at locations in the array describable by coordinate sets;
a function applier configured to apply an ordered set of functions to the array, wherein applying the ordered set of functions to the array comprises:
applying a first function to the array, by the at least one processor, wherein the first function is selected from an ordered set of functions, wherein applying the first function comprises:
applying a first range value from an ordered set of range values for the first function to generate a first coordinate set;
moving a first data unit in the array at a location described by the first coordinate set to a disassembled data container;
applying a second range value from the ordered set of range values for the first function to generate a second coordinate set, wherein the second range value is positioned immediately after the first range value according to the ordered set of range values; and
moving a second data unit in the array at a location described by the second coordinate set to the disassembled data container in a position immediately after a position of the first data unit; and
applying a second function to the array, by the at least one processor, wherein the second function is selected from the ordered set of functions, and wherein the second function is positioned immediately after the first function according to the ordered set of functions;
a function feeder configured to provide the ordered set of functions to the function applier; wherein the function applier is also configured to reassemble the data structure, wherein reassembling the data structure comprises:
applying a last function from the ordered set of functions to the array and the disassembled data container, wherein the last function is a final function that was applied during disassembly of the data structure, and wherein applying the last function comprises:

applying a last range value form an ordered set of range values for the last function to generate a last coordinate set, wherein the last range value is a final range value that used to apply the last function during disassembly of the data structure;

moving a last data unit from the disassembled data container to a location at the array described by the last coordinate set, wherein the last data unit is a final data unit written to the disassembled data container during disassembly of the data structure;

applying a next-to-last range value from the ordered set of range values for the last function to generate a next-to-last coordinate set, wherein the next-to-last range value was used to apply the last function immediately before the last range value was used during disassembly of the data structure; and moving a next-to-last data unit from the disassembled data container to a location at the array described by the next-to-last coordinate set, wherein the next-to-last data unit is immediately prior to the last data unit at the disassembled data container; and applying a next-to-last function from the ordered set of functions to the array and the disassembled data container, wherein the next-to-last function was applied during disassembly of the data structure immediately before the last function.

19. The machine of claim 18, further comprising a random number generator configured to generate random or pseudorandom numbers.

20. The machine of claim 19, wherein applying the first function further comprises:

generating, by the random number generator, a random replacement value; and writing the random replacement value to the location described by the first coordinate set.

* * * * *

UNITED STATES PATENT AND TRADEMARK OFFICE
CERTIFICATE OF CORRECTION

PATENT NO. : 9,652,622 B2
APPLICATION NO. : 14/574039
DATED : May 16, 2017
INVENTOR(S) : Garfinkle et al.

Page 1 of 1

It is certified that error appears in the above-identified patent and that said Letters Patent is hereby corrected as shown below:

In the Claims

In Column 17, Line 57, in Claim 1, delete "lo" and insert --to-- therefor

Signed and Sealed this
Twenty-eighth Day of May, 2019

Andrei Iancu
*Director of the United States Patent and Trademark Office*